Figure 1:
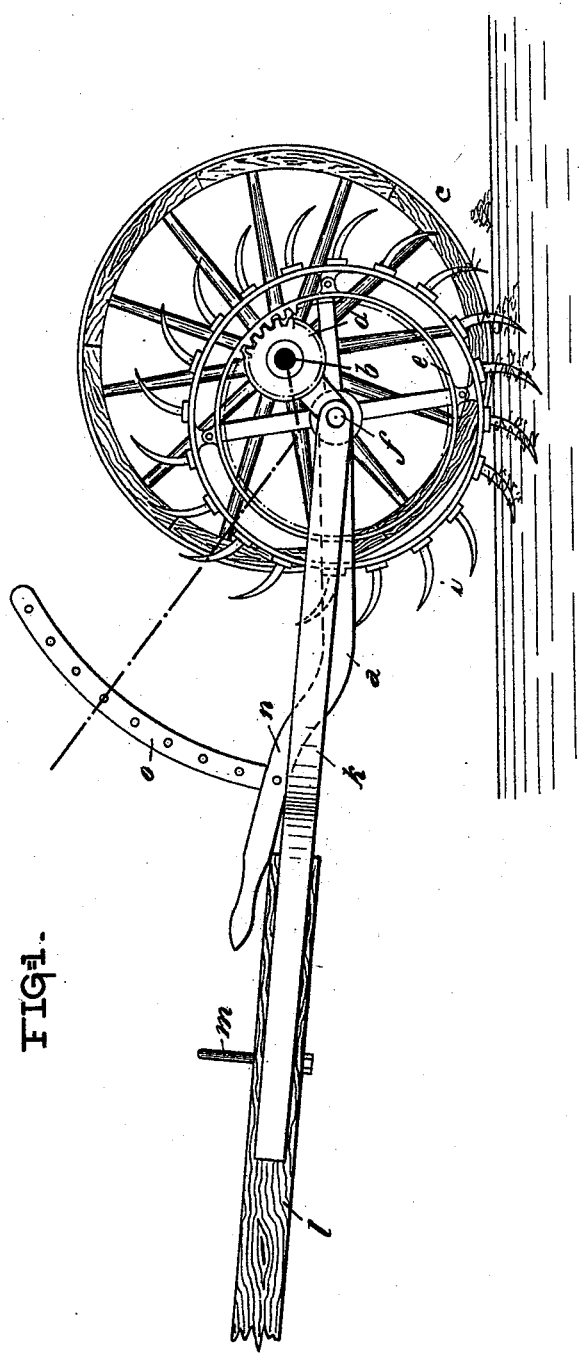

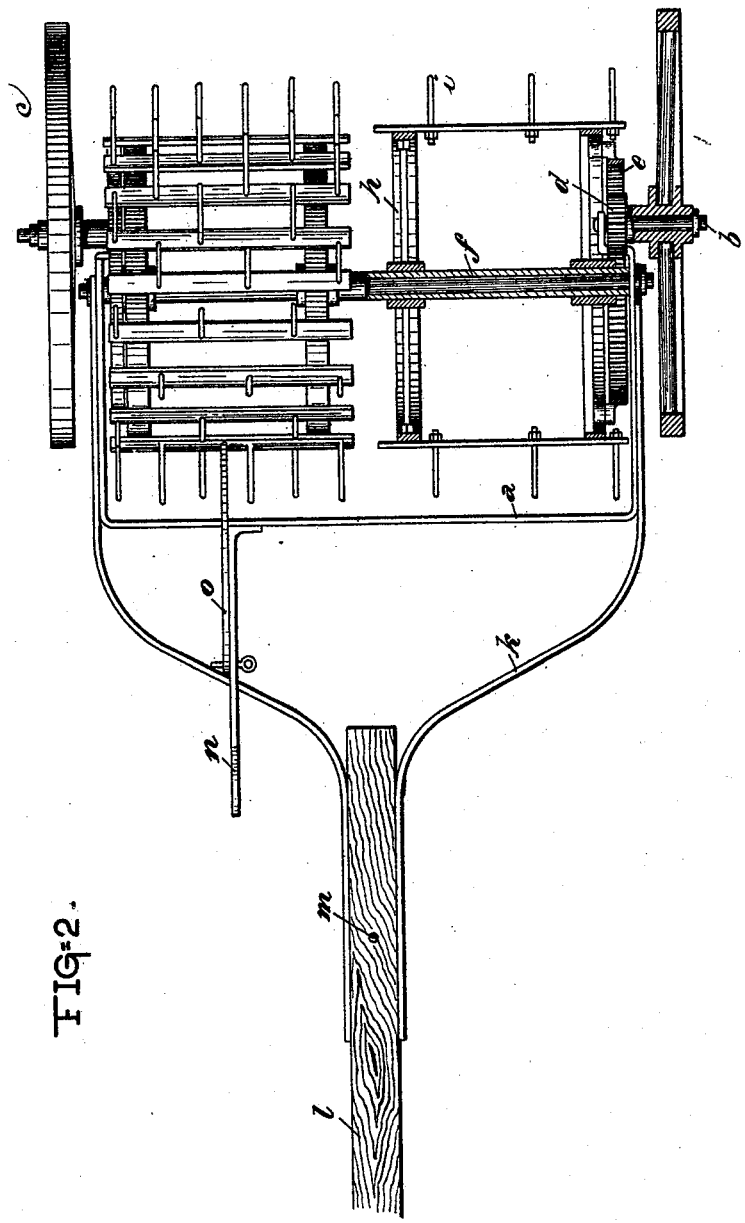

UNITED STATES PATENT OFFICE.

LEOPOLD SCHNACKENBURG, OF SCHWETZ, GERMANY.

WEEDING-MACHINE.

SPECIFICATION forming part of Letters Patent No. 498,311, dated May 30, 1893.

Application filed February 28, 1893. Serial No. 464,125. (No model.)

*To all whom it may concern:*

Be it known that I, LEOPOLD SCHNACKENBURG, a subject of the Emperor of Germany, and a resident of Schwetz, in the Empire of Germany, have invented a new and useful Weeding-Machine for the Pulling of Quick-Grass, of which the following is a specification.

The weeding-machine is represented by the accompanying drawings in which—

Figure 1 is a longitudinal section and Fig. 2 the plan of the machine, is arranged as follows:

The angled ends of the bow-frame $a$ are provided with two axle-journals $b$, which hold the driving-wheels $c$. On the naves of these wheels, the two small toothed wheels $d$ are fixed, which catch into the wheels with inside-gearing $e$. The axle $f$ is put through two holes of the frame $a$. Two pipes $g$ are put loosely on this axle, each of the pipes being half as long as the free length of the axle $f$ inside the bow-frame. On each of these pipes two drum-plates $h$ are fixed by means of naves and arms, onto which the rakes $i$ are screwed. Every rake has several teeth which are attached in such a way that the teeth of the first rake are standing between the teeth of the next. Thus two drums are formed, turning on the axle $f$ independent from each other. Onto the arms of the outside drum-plate $h$, the inside toothed wheel $e$ is screwed, thus making the rotation of the drum dependent of the turning of the driving-wheels $c$, so that the rake-drum must turn—in accordance with the wheels $e$ and $d$—slower than the driving-wheels $c$.

The frame $k$ is suspended on the ends of the axle $f$; in its middle it carries a pole $l$ with draw-hook $m$, to which animals can be put in the ordinary way. The frame $k$ will turn round the axle $f$. The lever $n$ is screwed to the frame $a$ and with the curved adjusting-stay $o$ which is firmly connected to the frame $k$, it can be put higher or lower. When the lever $n$ rests on the frame $k$, the rake-drums are so low that the teeth can entirely enter the ground. If the lever $n$ is adjusted higher the rake-drums are lifted, and at the highest position of the lever $n$ the teeth become quite free of the ground. In this state the machine can be easily transported on any road.

When the weeder is required to work, it is taken on the field in a lifted state; on the field the rake-drum is let down by means of the lever $n$ according to how the teeth are required to catch into the ground, and the apparatus is moved same as is done with an ordinary harrow.

For convenience a driver's seat may be provided on the frame $k$, also wipers for the teeth may be attached to the frame $k$, but these are hardly ever required, as the shocks are sufficient to make the quick-grass, which is pulled out, fall off from the teeth. The apparatus also works if the ground is moderately moist.

What I claim is—

In a machine for pulling quick-grass and other rooted weeds out of the ground; the combination of drums which are provided with rakes $i$ being slowly rotated by the driving-wheels while moving on, so that the teeth move on in the directing of driving, at a slower speed than the machine itself, gradually leaving the ground, and enabling the weeds to fall off, with the frames $k$ and $a$, the toothed wheels $e$ and $d$, and the axle $f$, as set forth.

LEOPOLD SCHNACKENBURG.

Witnesses:
PAUL RESSLER,
ANTON WENGER.